United States Patent [19]
Wang et al.

[11] Patent Number: 6,076,856
[45] Date of Patent: Jun. 20, 2000

[54] BELT TENSION AND ENERGY ABSORBING APPARATUS

[75] Inventors: Jenne-Tai Wang; Qing Zhou, both of Troy; Edward Aloysius Jedrzejczak, Brown City, all of Mich.

[73] Assignee: General Motors Corporation, Detroit, Mich.

[21] Appl. No.: 09/229,239

[22] Filed: Jan. 12, 1999

[51] Int. Cl.$^7$ .................................................. B60R 22/36
[52] U.S. Cl. ............................................................ 280/806
[58] Field of Search ............................................. 280/806

[56] References Cited

U.S. PATENT DOCUMENTS

| | | | |
|---|---|---|---|
| 4,258,934 | 3/1981 | Tsuge et al. | 280/806 |
| 4,288,098 | 9/1981 | Tsuge et al. | 280/806 |
| 4,422,669 | 12/1983 | Chiba et al. | 280/806 |
| 4,441,738 | 4/1984 | Tsuge et al. | 280/806 |
| 5,207,618 | 5/1993 | Nishizawa | 474/101 |
| 5,310,219 | 5/1994 | Föhl | 280/806 |
| 5,358,275 | 10/1994 | Föhl | 280/806 |
| 5,480,190 | 1/1996 | Föhl | 280/806 |
| 5,519,997 | 5/1996 | Specht | 60/632 |
| 5,568,940 | 10/1996 | Lane, Jr. | 280/806 |
| 5,588,677 | 12/1996 | Kopetzky et al. | 280/806 |
| 5,639,120 | 6/1997 | Kmiec et al. | 280/806 |
| 5,667,246 | 9/1997 | Miller, III | 280/806 |
| 5,671,949 | 9/1997 | Bauer et al. | 280/806 |
| 5,676,397 | 10/1997 | Bauer | 280/806 |
| 5,887,897 | 3/1999 | Gill et al. | 280/806 |
| 5,927,756 | 7/1999 | Wier | 280/806 |
| 5,944,350 | 8/1999 | Grabowski et al. | 280/806 |

OTHER PUBLICATIONS

Reserarch Disclosure 36852 "Seat Belt Pre–tensioner and Load" dated Dec. 10, 1994 (one page).

*Primary Examiner*—Kenneth R. Rice
*Attorney, Agent, or Firm*—Kathryn A. Marra

[57] ABSTRACT

A belt tension and energy absorbing apparatus for a motor vehicle seat belt including a stationary tube attached to a body of the motor vehicle, a piston slidable in the stationary tube, a connecting member between the seat belt and the piston, a source of gas at elevated pressure, and an energy absorber. A bulkhead in the stationary tube between the ends thereof cooperates with the piston in defining a pressure chamber in the stationary tube. When sensors on the motor vehicle detect rapid deceleration, gas from the source of gas at elevated pressure is introduced into the pressure chamber and propels the piston through a tension stroke in a first direction. After the tension stoke, the thrust of an occupant on the seat belt propels the piston in a second direction through an energy absorbing stroke during which the piston displaces the bulkhead a fraction of the occupant's kinetic energy is converted into work. Because the volume of the pressure chamber can be made relatively small without compromising the length of the energy absorbing stroke of the piston, the required volume of gas at elevated pressure and the expense attributable to producing that volume of gas are reduced.

6 Claims, 2 Drawing Sheets

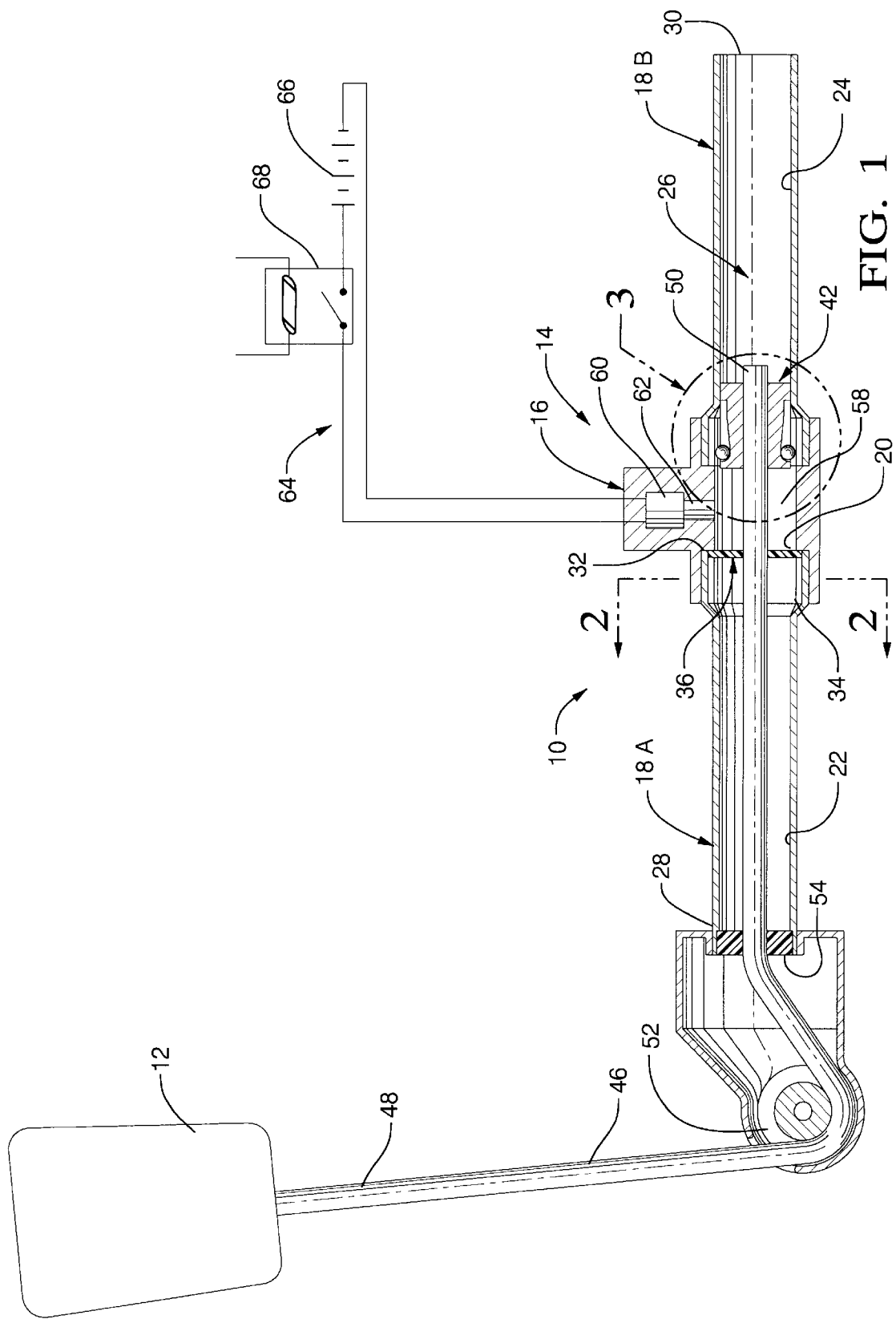

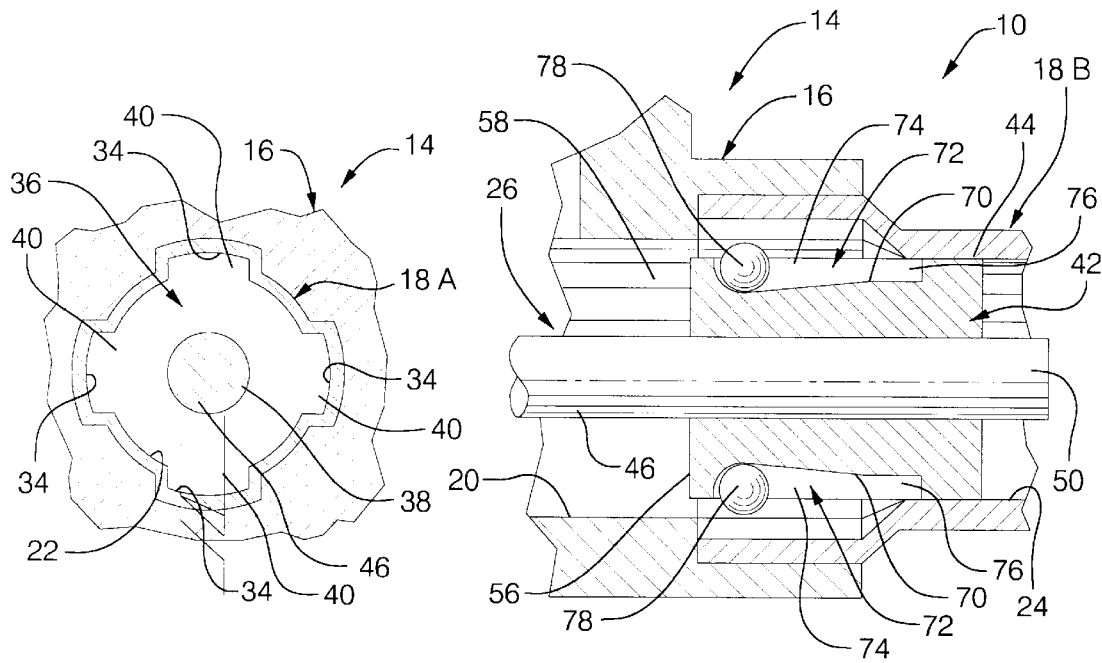

6,076,856

BELT TENSION AND ENERGY ABSORBING APPARATUS

TECHNICAL FIELD

This invention relates to a belt tension and energy absorbing apparatus for a motor vehicle occupant restraint belt.

BACKGROUND OF THE INVENTION

Motor vehicle occupant restraint systems have been proposed in which a lap belt and/or a shoulder belt, referred to individually and collectively as "seat belts", are connected to a body of the motor vehicle through a belt tensioning and energy absorbing apparatus. The basic structural elements of such an apparatus include a stationary tube attached to the motor vehicle body, a piston slidable in the tube, a connecting member between the seat belt and the piston, a source of gas at elevated pressure, and an energy absorber. When sensors on the motor vehicle detect rapid deceleration characteristic of a collision, gas from the source of gas at elevated pressure is introduced into a pressure chamber between a head end of the stationary tube and the piston. The gas propels the piston through a tension stroke in a first direction during which the seat belt, through the connecting member, is pulled snugly around an occupant of the motor vehicle. At the conclusion of the tension stoke, deceleration of the motor vehicle relative to the occupant thrusts the occupant forward against the seat belt which thrust is transferred to the piston through the connecting member. The piston is propelled by the occupant's thrust in a second direction opposite to the first direction through an energy absorbing stroke during which the energy absorber converts into work a fraction of the kinetic energy of the occupant. While the tension stoke of the piston is typically relatively short, the pressure chamber at the head end of the stationary tube must be relatively long in order to assure adequate clearance for the energy absorbing stroke of the piston. Otherwise, the energy absorbing stroke of the piston could be prematurely terminated by engagement on the head end of the stationary tube. Because the volume of the pressure chamber is thus relatively large, a substantial volume of gas at elevated pressure is required to propel the piston through its tension stoke. A belt tension and energy absorbing apparatus according to this invention is more economical to manufacture than similar prior apparatuses because the volume of the pressure chamber is relatively smaller and requires less gas at elevated pressure to propel the piston through its tension stoke.

SUMMARY OF THE INVENTION

This invention is a new and improved belt tension and energy absorbing apparatus for a motor vehicle seat belt including a stationary tube attached to a body of the motor vehicle, a piston slidable in the stationary tube, a connecting member between the seat belt and the piston, a source of gas at elevated pressure, and an energy absorber. A bulkhead in the stationary tube between the ends thereof cooperates with the piston in defining a relatively small pressure chamber in the stationary tube. When sensors on the motor vehicle detect rapid deceleration, gas from the source of gas at elevated pressure is introduced into the pressure chamber and propels the piston through a tension stroke in a first direction. At the conclusion of the tension stoke, the thrust of an occupant of the motor vehicle on the seat belt propels the piston in a second direction opposite to the first direction through an energy absorbing stroke during which the piston displaces the bulkhead in the stationary tube and the energy absorber converts into work a fraction of the kinetic energy of the occupant. Because the volume of the pressure chamber can be made relatively small without compromising the length of the energy absorbing stroke of the piston, the volume of gas at elevated pressure necessary to propel the piston through its tension stroke and the expense attributable to producing that volume of gas are reduced.

BRIEF DESCRIPTION OF THE DRAWINGS

FIG. 1 is a longitudinal sectional view of a belt tension and energy absorbing apparatus according to this invention for a motor vehicle seat belt;

FIG. 2 is an enlarged sectional view taken generally along the plane indicated by lines 2-2 in FIG. 1;

FIG. 3 is an enlarged view of the portion of FIG. 1 identified by reference circle 3; and FIG. 4 is a longitudinal sectional view of a modified belt tension and energy absorbing apparatus according to this invention for a motor vehicle seat belt.

DESCRIPTION OF THE PREFERRED EMBODIMENT

Referring to FIGS. 1–3, a belt tension and energy absorbing apparatus 10 according to this invention is disposed between a body, not shown, of a motor vehicle and a schematically represented seat belt buckle 12. A seat belt, not shown, has a tongue at one end which plugs into the buckle 12 and a retractor on the vehicle body at the other end which winds and unwinds the seat belt in conventional fashion. A stationary housing 14 of the belt tension and energy absorbing apparatus is rigidly attached to the vehicle body and includes a center housing portion 16 and a pair of tubular housing portions 18A, 18B each rigidly attached to the center housing portion on opposite sides thereof. A cylindrical passage 20 in the center housing portion 16 cooperates with a cylindrical passage 22 in the tubular housing portion 18A and with a cylindrical passage 24 in the tubular housing portion 18B in defining a stationary tube 26 on the vehicle body having a first end 28 and a second end 30.

The tubular housing portion 18A is locally radially expanded at an inboard end 32 thereof to define a plurality of inward-facing linear grooves 34, FIGS. 1–2 . A disc-shaped bulkhead 36 in the tubular housing portion 18A between the ends 28,30 of the stationary tube 26 has a center aperture 38 and a plurality of lugs 40. The bulkhead bears against a shoulder on the center housing portion 16 with the lugs 40 seated in respective ones of the inward-facing linear grooves 34.

A piston 42 in the stationary tube 26 has a cylindrical outside surface 44, FIG. 3, which cooperates with passages 20,22,24 in the center and tubular housing portions 16,18A, 18B in supporting the piston in the stationary tube for linear translation. A connecting member 46 has a first end 48 attached to the seat belt buckle 12 and a second end 50 attached to the piston 42 in a bore in the latter. The connecting member 46 traverses a guide roller 52 on the vehicle body, a guide bushing 54 at the end 28 of the stationary tube 26, and the aperture 38 in the bulkhead 36.

The bulkhead 36 cooperates with a side 56, FIG. 3, of the piston 42 in defining a pressure chamber 58 in the stationary tube 26 around the connecting member 46. A schematically represented gas generator 60 in the center housing portion 16 has a port 62 exposed to the pressure chamber 58 and an electrical ignition circuit 64 including a battery 66 and an acceleration responsive switch 68. When the acceleration responsive switch 68 is closed, gas at elevated pressure is produced in the gas generator 60 and introduced into the pressure chamber 58 through the port 62.

As seen best in FIGS. 1 and 3, the cylindrical outer surface 44 of the piston 42 is interrupted by a plurality of slots 70 which face the passages 20,22,24 in the center and tubular housing portions 16,18A,18B and cooperate therewith in defining a corresponding plurality of rolling element chambers 72. Each rolling element chamber includes a wedge-shaped segment 74 having a deep end and a shallow end and a flat segment 76 which merges with the wedge-shaped segment at the shallow end thereof.

A plurality of spherical rolling elements 78 are disposed in respective ones of the rolling element chambers 72. The diameter of each of the spherical rolling elements is less than the depth of the wedge-shaped segment 74 of the corresponding rolling element chamber at the deep end thereof and is greater than the depth of the flat segment 76 of the corresponding rolling element chamber. The rolling elements 78 are made of a material, e.g. steel, having a hardness exceeding the hardness of the material from which the center and tubular housing portions 16,18A,18B are made but not exceeding the hardness of the material from which the piston 42 is made.

The seat belt 12 is typically loosely draped over an occupant of the motor vehicle for maximum comfort. At the same time, the rolling elements 78 are lodged at the deep ends of the wedge-shaped segments 74 of the rolling element chambers 72 where they have minimal contact with the tubular housing portion 18B. Friction, including friction between the connecting member 46 and the guide roller 52 maintains the connecting member 46 and the seat belt buckle 12 stationary while the aforesaid seat belt retractor winds and unwinds the seat belt in conventional fashion for occupant comfort.

In the circumstance that the motor vehicle impacts an object, the corresponding very rapid deceleration of the vehicle body causes the aforesaid seat belt retractor to lock and the acceleration responsive switch 68 to close. When the switch 68 closes, gas at elevated pressure produced in the gas generator 60 is introduced into the pressure chamber 58 through the port 62. The gas propels the piston in a first direction toward the end 30 of the stationary tube 26 through a relatively short tension stoke during which the piston, through the connecting member 46, pulls the seat belt buckle 12 down to snugly tighten the seat belt around the occupant.

The bulkhead 36 fits tightly in the tubular housing portion 18A and around the connecting member 46 to minimize leakage of gas from the pressure chamber and to prevent the pressure force applied by the gas in the pressure chamber from displacing the bulkhead in the stationary tube. Importantly, the piston 42 is relatively close to the bulkhead 36 at the onset of the tension stroke of the piston so that the volume of the pressure chamber is small and only a correspondingly small volume of gas at elevated pressure is required to fill the pressure chamber and propel the piston through its tension stroke.

At the conclusion of the tension stroke of the piston 42, the occupant of the motor vehicle is thrust against the seat belt due to the vehicle body decelerating more rapidly than the occupant. With the aforesaid seat belt retractor locked, the thrust of the occupant on the seat belt is transferred through the seat belt buckle 12 and the connecting member 46 to the piston 42 and propels the piston in a second direction toward the end 28 of the stationary tube 26 through an energy absorbing stroke. At the onset of the energy absorbing stroke of the piston, the rolling elements 78 traverse the wedge-shaped segments 74 of the rolling element chambers 72 and become interference fitted in the flat segments 76 between the piston and the tubular housing portion 18B. During subsequent linear translation of the piston 42 in the stationary tube 26, the rolling elements plastically deform the center and tubular housing portions 16,18A,18B by rolling or plowing tracks therein thereby to absorb energy by converting into work a fraction of the kinetic energy of the occupant of the motor vehicle. Because the hardness of the rolling elements does not exceed the hardness of the piston, the piston is not plastically deformed by the rolling elements during the energy absorbing stroke of the piston. The diameter of the passage 20 is slightly greater than the diameters of the passages 22,24 so that the resistance to rolling or plowing of the rolling elements 78 remains substantially constant as the rolling elements traverse the passages 24,20,22.

Importantly, the energy absorbing stroke of the piston 42 may overlap the bulkhead 36 in the stationary tube 26 because the piston engages and displaces the bulkhead during its energy absorbing stroke, e.g. by fracturing the bulkhead. Accordingly, the length of the energy absorbing stroke of the piston exceeds the combined lengths of the pressure chamber 58 and the tension stoke of the piston and may include substantially the full length of the tubular housing portion 18A behind the bulkhead. Because the length of the energy absorbing stroke of the piston is independent of the length of the pressure chamber 58, the volume of the pressure chamber can be optimized for the tension stroke of the piston without compromising the energy absorbing stroke of the piston. By optimizing the volume of the pressure chamber for the tension stroke of the piston, the volume of gas at elevated pressure required to propel the piston through its tension stroke and the expense attributable to producing that volume of gas at elevated pressure are minimized.

A modified belt tension and energy absorbing apparatus 80 according to this invention is illustrated in FIG. 4. Structural elements common to both the belt tension and energy absorbing apparatus 10 and the modified belt tension and energy absorbing apparatus 80 are identified by primed reference characters in FIG. 4. The modified belt tension and energy absorbing apparatus 80 includes a stationary housing 14' having a stationary tube 26' therein. The stationary tube 26' has a pair of opposite ends 28', 30'.

A piston 42' is supported in the stationary tube 26' for linear translation. A connecting member 46' traverses a guide bushing 54' at the end 28' of the stationary tube and is attached to a seat belt buckle and to the piston 42'. A plurality of rolling elements 78' are disposed in respective ones of a plurality of rolling element chambers 72' defined between the piston and the stationary tube 26'.

A tubular insert 82 in the stationary tube 26' around the connecting member 46' seats against the bushing 54' and has an annular distal end 84 facing the piston 42'. The distal end 84 of the insert 82 defines a bulkhead in the stationary tube 26' between the ends 28', 30' thereof which cooperates with a side 56' of the piston in defining a pressure chamber 58'. The insert 82 is preferably made of crushable plastic foam. A schematically represented gas generator 60' in a center housing portion 16' of the stationary housing 14' has a port 62' exposed to the pressure chamber 58' and an electrical ignition circuit 64' including a battery 66' and an acceleration responsive switch 68'.

In the circumstance that the motor vehicle impacts an object, the switch 68' closes and gas at elevated pressure produced in the gas generator 60' fills the pressure chamber 58' through the port 62'. The gas propels the piston in a first direction toward the end 30' of the stationary tube 26' through a relatively short tension stoke. The material from which the insert 82 is made resists displacement of the bulkhead defined by the distal end 82 of the insert by the pressure force attributable to the gas at elevated pressure in the pressure chamber.

At the conclusion of the tension stroke of the piston 42', the thrust of the occupant on the seat belt is transferred by the connecting member 46' to the piston and propels the piston in a second direction toward the end 28' of the stationary tube 26' through an energy absorbing stroke. During the energy absorbing stroke of the piston, the rolling elements 78' plastically deform the center housing portion 16' and a pair of tubular housing portions 18A',18B' by rolling or plowing tracks therein to absorb energy by converting into work 30 a fraction of the kinetic energy of the occupant of the motor vehicle.

The energy absorbing stroke of the piston 42' may overlap the bulkhead defined by the distal end 84 of the insert 82 because the piston engages and displaces the bulkhead during its energy absorbing stroke by crushing the insert. Accordingly, the length of the energy absorbing stroke of the piston exceeds the combined lengths of the tension stoke of the piston and of the pressure chamber 58' and may include substantially the full length of the tubular housing portion 18A. Because the piston crushes the insert 82 during its energy absorbing stroke, the volume of the pressure chamber 58' can be optimized for the tension stroke of the piston without compromising the energy absorbing stroke of the piston.

What is claimed is:

1. A tension and energy absorbing apparatus for a motor vehicle seat belt comprising:

a stationary tube on a body of the motor vehicle, a bulkhead means in the stationary tube between a pair of opposite ends thereof, a piston supported in the stationary tube for linear translation having a side facing the bulkhead means and cooperating therewith in defining a pressure chamber in the stationary tube between the bulkhead means and the piston, a connecting member traversing the bulkhead means through an aperture therein having a first end attached to the seat belt and a second end attached to the piston, a gas pressure producing means operative in response to rapid deceleration of the motor vehicle to fill the pressure chamber with gas at elevated pressure so that the piston is propelled in a first direction through a tension stroke pulling the seat belt snugly around an occupant of the motor vehicle, the occupant of the motor vehicle being thrust against the seat belt at the conclusion of the tension stroke of the piston and applying a force on the piston through the connecting member inducing linear translation of the piston in a second direction opposite the first direction through an energy absorbing stroke overlapping the bulkhead means so that the piston displaces the bulkhead means in the stationary tube during the energy absorbing stroke, and an energy absorber means operative to apply a force to the piston opposing linear translation of the piston in the second direction through the energy absorbing stroke.

2. The tension and energy absorbing apparatus for a motor vehicle seat belt recited in claim 1 wherein the energy absorber means comprises:

a plurality of slots in the piston facing and cooperating with the stationary tube in defining a corresponding plurality of rolling element chambers between the piston and the stationary tube each having a wedge-shaped segment with a deep end and a shallow end and a flat segment merging with the wedge-shaped segment at the shallow end thereof, and a plurality of rolling elements in respective ones of the plurality of rolling element chambers each having a diameter less than the depth of the deep end of the wedge-shaped segment of the corresponding one of the rolling element chambers and greater than the depth of the flat segment of the corresponding one of the rolling element chambers, each of the plurality of rolling elements being lodged in the deep end of the wedge-shaped segment of the corresponding one of the rolling element chambers during linear translation of the piston in the first direction and being interference fitted in the flat segment of the corresponding one of the rolling element chambers between the piston and the stationary tube during linear translation of the piston in the second direction so that linear translation of the piston in the second direction is resisted by a force attributable to plastic deformation of the stationary tube by each of the rolling elements.

3. The tension and energy absorbing apparatus for a motor vehicle seat belt recited in claim 2 wherein the bulkhead means comprises:

a planar disc supported on the stationary tube in a plane perpendicular to the direction of linear translation of the piston having an aperture therein for passage therethrough of the connecting member.

4. The tension and energy absorbing apparatus for a motor vehicle seat belt recited in claim 2 wherein the bulkhead means comprises:

a guide bushing in the stationary tube between the seat belt and the piston having an aperture therein for passage therethrough of the connecting member, and a crushable insert in the stationary tube around the connecting member having an annular first end seated against the guide bushing and an annular second end defining the bulkhead in the stationary tube between the opposite ends thereof facing the side of the piston and cooperating therewith in defining the pressure chamber in the stationary tube.

5. The tension and energy absorbing apparatus for a motor vehicle seat belt recited in claim 3 wherein the plurality of rolling elements comprises:

a plurality of spheres each having a hardness exceeding the hardness of the stationary tube and not exceeding the hardness of the piston.

6. The tension and energy absorbing apparatus for a motor vehicle seat belt recited in claim 4 wherein the plurality of rolling elements comprises:

a plurality of spheres each having a hardness exceeding the hardness of the stationary tube and not exceeding the hardness of the piston.

* * * * *